United States Patent [19]

Sakamoto et al.

[11] Patent Number: 5,093,609
[45] Date of Patent: Mar. 3, 1992

[54] SERVOMOTOR CONTROL METHOD

[75] Inventors: Keiji Sakamoto, Hachioji; Shinji Seki, Kokubunji; Yasusuke Iwashita, Yamanashi, all of Japan

[73] Assignee: Fanuc Ltd, Minamitsuru, Japan

[21] Appl. No.: 415,328

[22] PCT Filed: Jan. 12, 1989

[86] PCT No.: PCT/JP89/00029

§ 371 Date: Sep. 7, 1989

§ 102(e) Date: Sep. 7, 1989

[87] PCT Pub. No.: WO89/06892

PCT Pub. Date: Jul. 27, 1989

[30] Foreign Application Priority Data

Jan. 19, 1988 [JP] Japan .................. 63-008792

[51] Int. Cl.[5] ............................................... G05B 13/00
[52] U.S. Cl. ................................... 318/610; 318/561; 318/609; 318/615; 364/164; 364/148
[58] Field of Search .................. 318/560–680; 364/156–168, 148, 180, 181, 182, 183

[56] References Cited

U.S. PATENT DOCUMENTS

| | | | |
|---|---|---|---|
| 3,864,554 | 2/1975 | Chevalier et al. | 364/161 |
| 3,940,594 | 2/1976 | Bleak et al. | 364/161 |
| 4,354,224 | 10/1982 | Sato | 364/160 X |
| 4,408,148 | 10/1983 | Herzog | 318/610 |
| 4,415,966 | 11/1983 | Herzog | 318/610 X |
| 4,549,123 | 10/1985 | Hagglund et al. | 364/162 X |
| 4,562,528 | 12/1985 | Baba | 364/187 X |
| 4,587,470 | 5/1986 | Yamawaki | 318/564 |
| 4,641,235 | 2/1987 | Shigemasa et al. | 318/610 X |
| 4,675,804 | 6/1987 | Wiemer | 364/161 |
| 4,680,518 | 7/1987 | Kurakake et al. | 318/615 |
| 4,697,768 | 10/1987 | Klein | 318/584 X |
| 4,719,561 | 1/1988 | Shigemasa | 364/148 |
| 4,754,391 | 6/1988 | Suzuki | 364/162 X |
| 4,755,924 | 7/1988 | Hiroi | 364/160 X |
| 4,791,548 | 12/1988 | Yoshikawa et al. | 364/164 X |
| 4,816,734 | 3/1989 | Kurakake et al. | 318/615 |
| 4,851,754 | 7/1989 | Sakamoto et al. | 318/616 |
| 4,874,999 | 10/1989 | Kuwabara et al. | 318/610 |
| 4,882,526 | 11/1989 | Iino et al. | 318/561 |
| 4,914,315 | 4/1990 | Murakami et al. | 318/636 X |

*Primary Examiner*—Paul Ip
*Attorney, Agent, or Firm*—Staas & Halsey

[57] ABSTRACT

A servomotor control method controls a servomotor stably at a high speed. A control loop is switched from a PI control mode to an I-p control mode by varying a gain coefficient of a proportional arithmetic unit (1). This achieves a control process having the advantages of both the PI and I-p control modes.

6 Claims, 5 Drawing Sheets

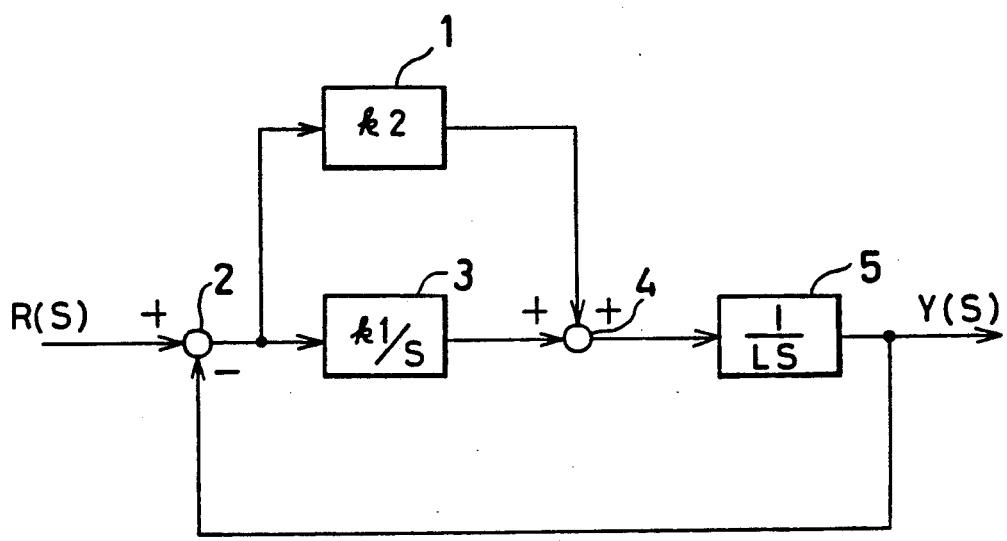
F I G. 2

SERVOMOTOR CONTROL METHOD

CROSS REFERENCE TO RELATED APPLICATION

This application is cross-referenced to U.S. Ser. No. 07/368,291, filed on May 24, 1989, to Sakamoto et al.

BACKGROUND OF THE INVENTION

The present invention relates to a method of controlling a servomotor. More particularly, the present invention is directed to a servomotor control method for continuously switching a control loop from a PI control mode to an I-p control mode for increased response and stability.

PI and I-p control modes are widely employed for the control of current and speed loops of servomotors. The control process of each of the PI and I-p control modes is carried out in a fixed manner.

The PI control mode is highly responsive, but has low stability and accuracy. Conversely, the I-p control mode is highly stable and accurate, but responds poorly.

SUMMARY OF THE INVENTION

In view of the aforesaid drawback of the known control modes, it is an object of the present invention to provide servomotor control method for continuously switching a control loop from a PI control mode to an I-p control mode for increased response and stability.

To accomplish the above object, there is provided a method of stably controlling a servomotor stably at a high speed, the method comprising the step of continuously switching a control loop from a PI control mode to an I-p control mode.

By thus continuously switching the control loop from the PI control mode to the I-p control mode, the response of the PI control mode and the stability and accuracy of the I-p control mode are combined to allow optimum control.

BRIEF DESCRIPTION OF THE DRAWINGS

FIG. 2 is is an equivalent block diagram of the arrangement shown in FIG. 1, when a variable $\alpha = 1$;

DESCRIPTION OF THE PREFERRED EMBODIMENTS:

An embodiment of the present invention will hereinafter be described with reference to the drawings.

Figure 1:
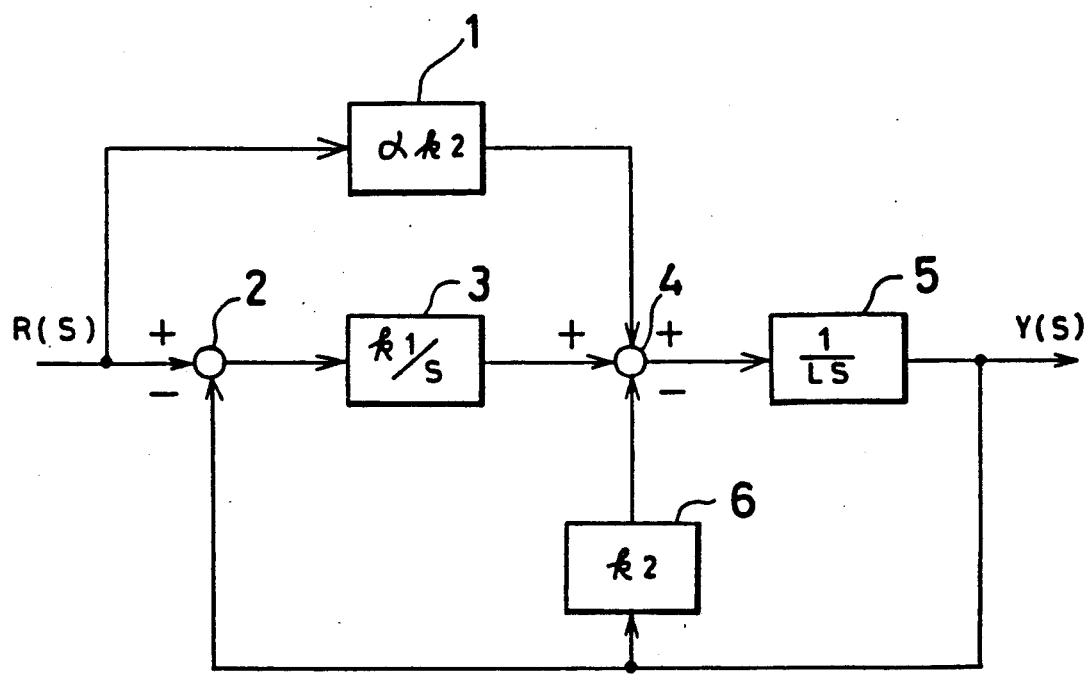
FIG. 1 is a block diagram of an arrangement for carrying out a servomotor control method according to an embodiment of the present invention.

FIG. 1 is a block diagram of an arrangement for carrying out a servomotor control method according to an embodiment of the present invention. A control loop employed here is a current control loop. Denoted at R(s) is a current command value, Y(s) a current output, 1 a proportional arithmetic unit for the current command value, k2 a proportional gain, and $\alpha$ a variable for multiplying the proportional gain, the variable $\alpha$ being variable in the range of $0 \leq \alpha \leq 1$. The manner in which the variable u varies will be described in detail later on.

Denoted at 2 is an arithmetic unit for producing as an output the difference between the current command value R(s) and the current output Y(s), 3 an integrator, k1 an integral gain, 4 an arithmetic unit for adding the output from the proportional arithmetic unit 1 and the output from the integrator 3, subtracting the product of the current output Y(s) and the proportional gain k2 from the sum, and producing the difference as an output, 5 a servomotor winding, and L the inductance of the servomotor winding.

When $\alpha = 0$, since the path of $\alpha k2$ is eliminated, the control mode of the arrangement of FIG. 1 becomes an I-p control mode. When $\alpha = 1$, the arrangement of FIG. 1 becomes equivalent to a control loop shown in FIG. 2, which is a PI control mode. Those parts shown in FIG. 2 which are identical to those of FIG. 1 are designated by identical reference characters, and will not be described in detail.

Figure 3:
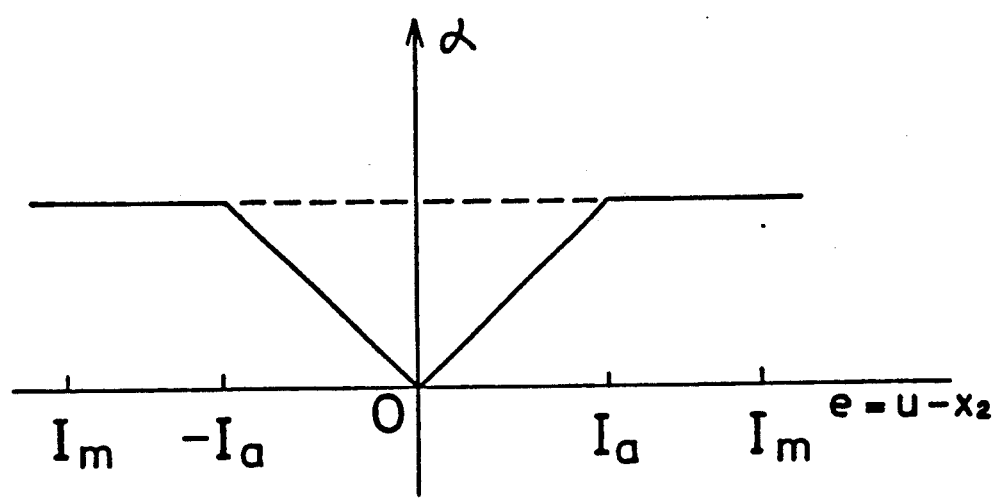
FIG. 3 is a diagram showing the relationship between an error e and the variable $\alpha$.

The manner in which the variable $\alpha$ is controlled will be described below. By way of example, the variable $\alpha$ is controlled as a function of an error e. FIG. 3 illustrates the relationship between the error e and the variable $\alpha$. The horizontal axis of FIG. 3 indicates e and the vertical axis $\alpha$. As shown in FIG. 3, when the error e is smaller than a constant value—Ia, the variable $\alpha$ is 1, and when the error e ranges from—Ia to Ia, the variable $\alpha$ is given by:

$$\alpha = |e|/Ia$$

When the error e is larger than Ia, the variable $\alpha = 1$ again. That is, the variable $\alpha$ is expressed as follows:
when $|e| \geq Ia$, $\alpha = 1$
when $|e| < Ia$, $\alpha = |e|/Ia$ When the error e is large, the current control loop is controlled in a manner close to the PI control mode to increase the response. When the error e is small, the current control loop is controlled in a manner close to the I-p control mode to maintain stability and accuracy. Thus, a control mode having the advantages both of the PI and I-p control modes is achieved.

Figure 4:
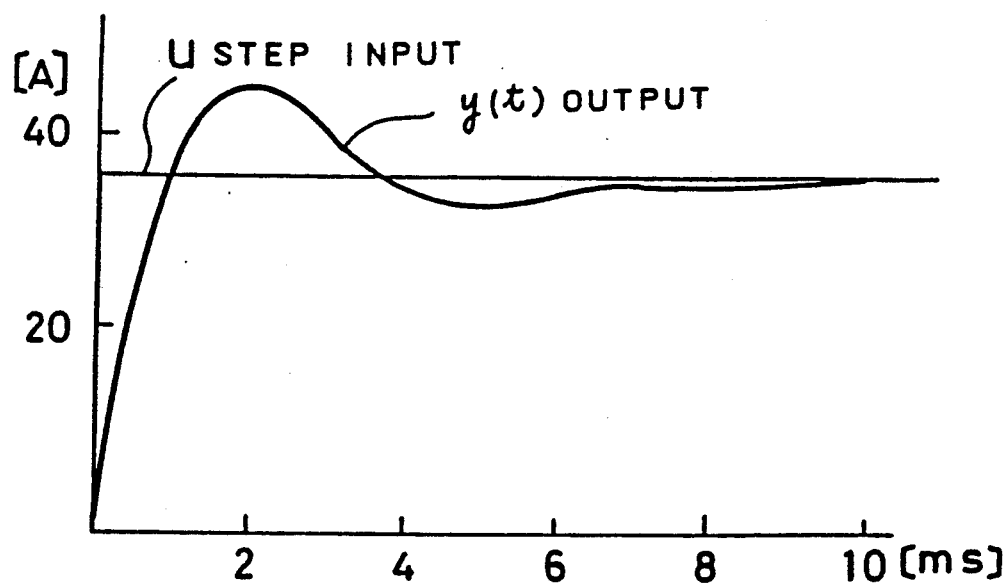
FIG. 4 is a graph of the response of a conventional PI control mode.

An example of the response of the servomotor control method according to the present invention will be illustrated in comparison with those of conventional PI and I-p control modes. FIG. 4 is a graph of the response of the conventional PI control mode by way of example. The horizontal axis of FIG. 4 represents time (msec.) and the vertical axis a current value. An input is a step input u and an output is a current output y(t). As shown in FIG. 4, the response is quick, but the overshoot is large and the accuracy and stability are bad.

Figure 5:
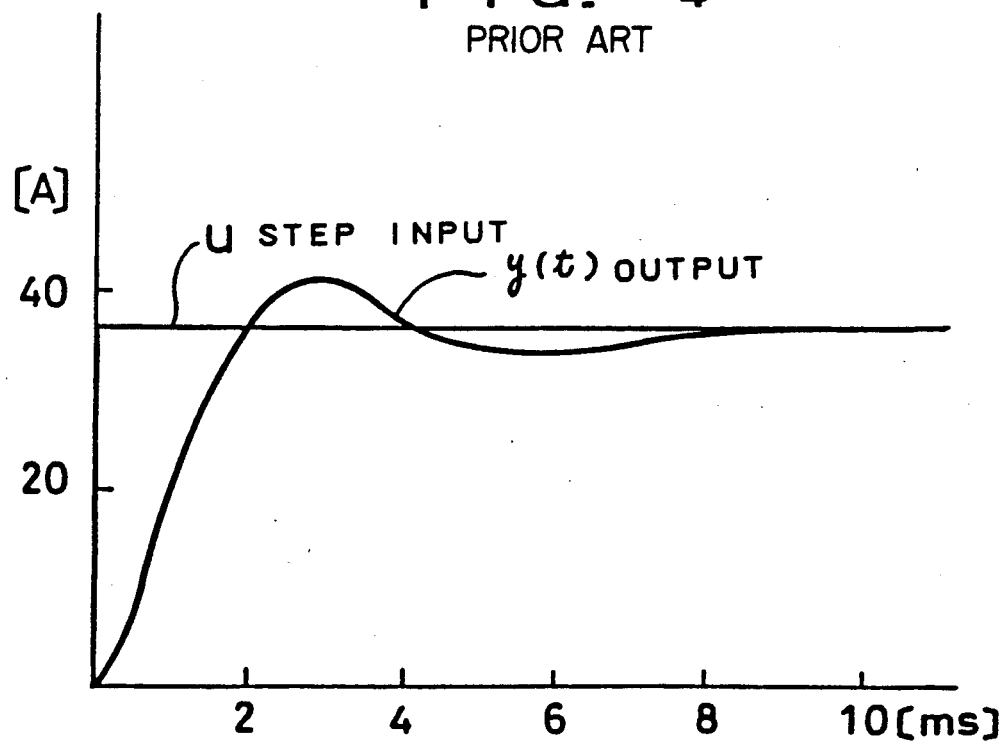
FIG. 5 is a graph of the response of a conventional I-p control mode by way of example.

FIG. 5 shows the response of the conventional I-p control mode. The horizontal and vertical axes of FIG. 5 indicate the same parameters as those of FIG. 4, with the same unit for the time. As shown in FIG. 5, the response is slow, but the overshoot is small and the stability and accuracy are good.

Figure 6:
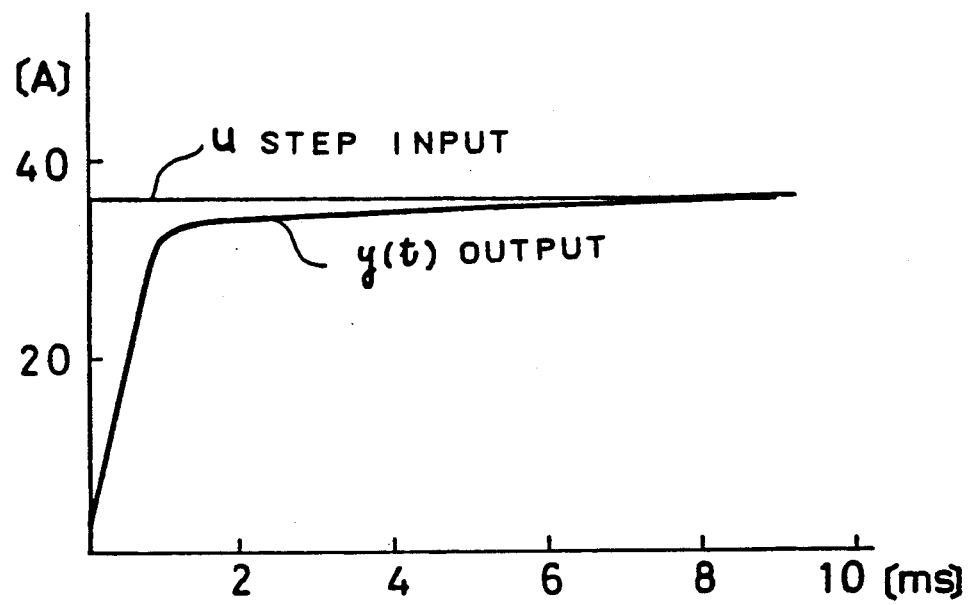
FIG. 6 is a diagram showing the response of the servomotor control method according to the present invention.

FIG. 6 is a graph of the response of the servomotor control method of the present invention. The horizontal and vertical axes of FIG. 6 indicate the same parameters as those FIG. 4, with same unit for the time. FIG. 6 clearly indicates that the response, stability, and accuracy are improved.

While the control loop has been described as a current loop, the control loop may become a speed control loop by replacing L in FIG. 1 with (Jm/Kt) or replacing (1/L) with (Kt/Jm). Therefore, not only a current loop but also a speed control loop can be controlled in the same way. Kt represents the torque constant of the servomotor, and Jm the rotor inertia of the servomotor.

The variable α has been defined as a linear function of the error e. However, it may be defined as another function depending on the control. Moreover, the variable α may be varied as a function of time or the like.

With the present invention, as described above, the control loop is switched continuously between the PI control mode and the I-p control mode, it is possible to control the servomotor with the advantages of both of these control modes.

Since the variable in the PI and I-p control modes are varied depending on the error, the servomotor can be controlled in a manner close to the PI control mode when the error is large and close to the I-p control mode when the error is small. Thus, the control depending on the error is made possible.

What is claimed is:

1. A method of stably controlling a servomotor at a high speed, comprising the steps of
   (a) reading an error;
   (b) continuously switching a control loop from a PI control mode to an I-p control mode in accordance with a proportional component of an input as a function of the error, the error function being defined by:
   when $|e| \geq Ia$, $\alpha = 1$;
   when $|e| < Ia$, $\alpha = |e|/Ia$;
   where e is the error, Ia is a predetermined error when the function is switched, and α is a variable for switching the gain of the proportional component; and
   (c) controlling the servomotor with the switched control mode.

2. A method according to claim 1, wherein the control loop is a current loop.

3. A method according to claim 1, wherein the control loop is a speed loop.

4. A method for stably controlling a servomotor at a high speed comprising the steps of:
   (a) receiving a current command value;
   (b) producing, in an arithmetic unit, a difference between the current command value and a current output;
   (c) integrating, in an integrator, the difference and outputting an integrated signal;
   (d) producing a proportional value of the current command value in a proportional arithmetic unit;
   (e) adding the integrated signal and the proportional value and obtaining a sum; and
   (g) outputting the current output to stably control the servomotor.

5. A method according to claim 4, wherein the proportional gain is multiplied by a variable being in a range between 0 and 1.

6. A method according to claim 5, wherein the variable is controlled as a function of an error.

* * * * *

UNITED STATES PATENT AND TRADEMARK OFFICE
CERTIFICATE OF CORRECTION

PATENT NO. : 5,093,609
DATED : MARCH 3, 1992
INVENTOR(S) : KEIJI SAKAMOTO ET AL.

It is certified that error appears in the above-identified patent and that said Letters Patent is hereby corrected as shown below:

Col. 1, line 31, "stably" (second occurrence) should be deleted;
line 52, "mode by way of example;" should be --mode;--;
line 53, "diagram showing" should be --graph of--;
line 58, "EMBODIMENTS:" should be --EMBODIMENTS--.

Col. 2, line 2, "variable u" should be --variable $\alpha$--;
line 64, "those FIG. 4, with same unit for the time." should be --those in FIG. 4, with the same unit for time.--.

Signed and Sealed this

Eighth Day of June, 1993

Attest:

MICHAEL K. KIRK

Attesting Officer

Acting Commissioner of Patents and Trademarks